June 14, 1960 S. SCHILLER 2,940,219
MEANS FOR PROMOTING PLANT GROWTH BY REFLECTING
LIGHT AND DEFLECTING WATER
Filed March 14, 1957 2 Sheets-Sheet 2
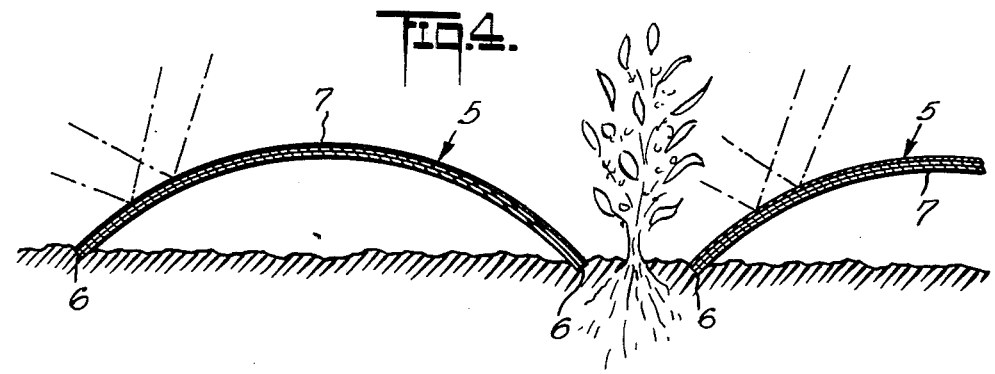
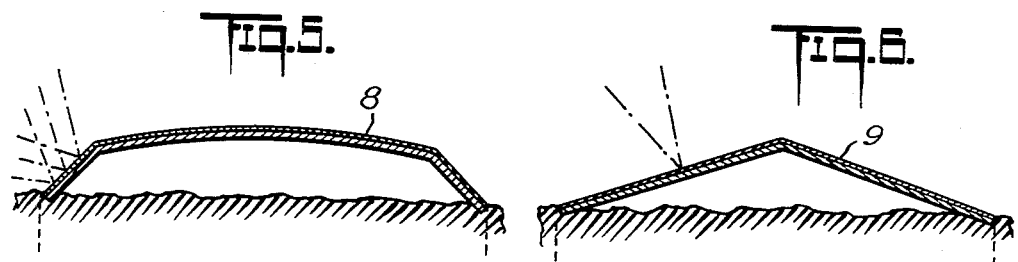
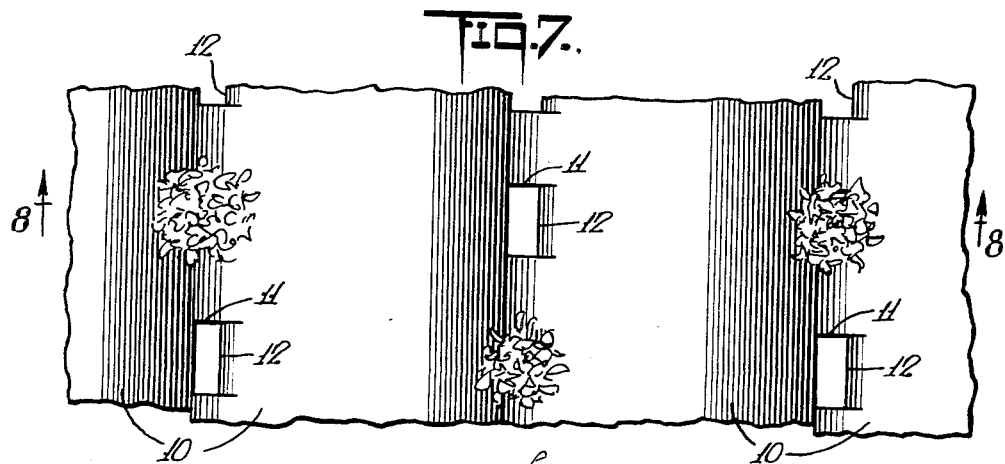
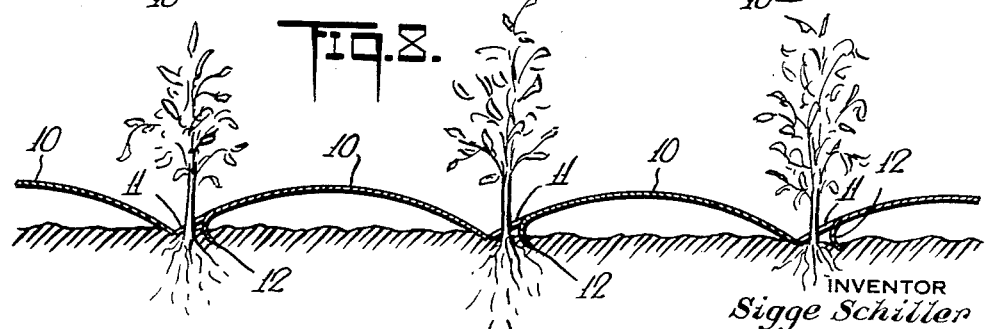
INVENTOR
Sigge Schiller
BY
ATTORNEYS United States Patent Office 2,940,219
Patented June 14, 1960

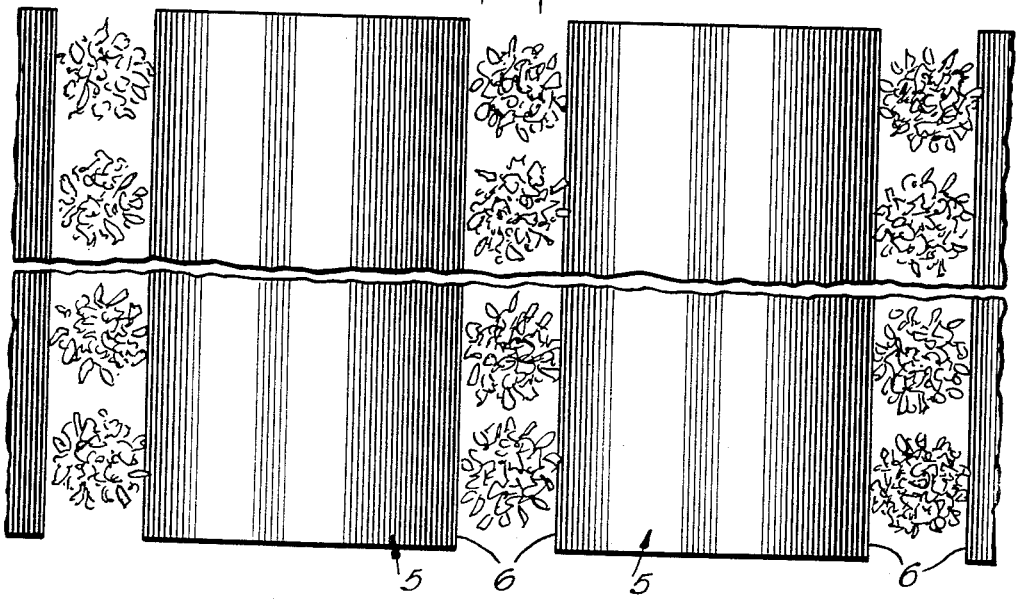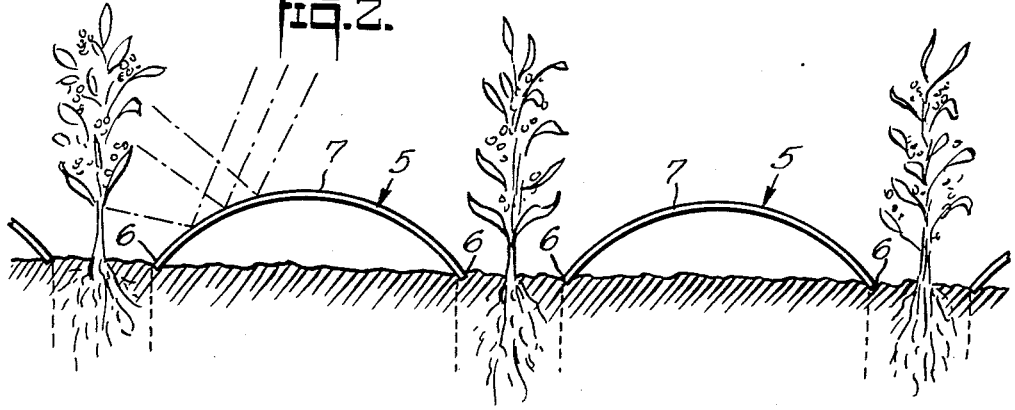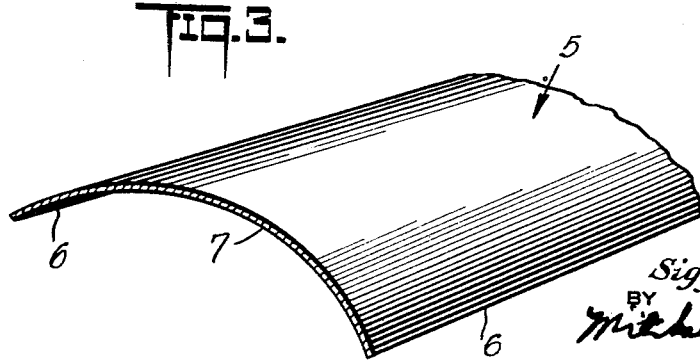

2,940,219

MEANS FOR PROMOTING PLANT GROWTH BY REFLECTING LIGHT AND DEFLECTING WATER

Sigge Schiller, 276 Sylvan St., Rutherford, N.J.

Filed Mar. 14, 1957, Ser. No. 645,956

3 Claims. (Cl. 47—32)

My invention relates to a means for promoting plant growth.

It is an object of the invention to provide a means for promoting plant growth by reflecting sunlight on to the rows of plants and directing sprinkled water on to the rows rather than between the same.

A more specific object is to provide an improved means for promoting plant growth comprising a sheet to be placed between rows and having a highly reflective outer surface for reflecting the sun's rays on to the plant rows and so formed as to direct the water on to the rows of plants.

Another object is to provide an improved means for promoting plant growth comprising a sheet of material in arched form so that the longitudinal edges may rest upon the ground and the intermediate portion between the edges will be raised from the ground so as to form a substitute for a mulch.

A further object is to provide a sheet of material to be placed between plant rows and formed transversely into an arch and being sufficiently flexible so as to be rolled up longitudinally for storage and being sufficiently resilient to generally spring back into place when unrolled from a roll.

It is still another object to provide an improved means to be placed between plant rows for reflecting the sun's rays on to the plants and for covering up the ground surface between rows so as to inhibit evaporation of water.

Other objects and various features of novelty and invention will be hereinafter pointed out or will become apparent to those skilled in the art.

Briefly stated, in a preferred form of the invention, I employ a sheet of material having a highly reflective outer surface to be placed between rows of plants and formed into an arch so that only the longitudinal edges touch the ground and the intermediate portion is raised from the ground. Similar sheets, in the preferred form, are placed on opposite sides of the row so that both sheets may reflect the sun's rays on to the plants in the row and water falling on the arched sheet will be directed on to the plant row rather than between the rows. The covering up of the ground between the rows inhibits the evaporation of moisture from the soil and thus saves frequent watering of the plants and yet provides sufficient moisture at the roots. The arched sheets serve as a substitute for a mulch, inhibit weed growth and evaporation of moisture and permit aeration of the soil.

The sheet or sheets are preferably of composite construction involving a body part of paper, fiber, plastic, wood, or the like, treated, if necessary, with weather-proofing materials and coated on the outside with a highly reflective surface material, preferably in the form of a sheet of highly reflective metal foil, such as aluminum. The sheets are sufficiently self-sustaining so as to maintain the arched form when placed between the rows, and yet are sufficiently flexible in the preferred form, to be rolled up longitudinally for storage. The sheets are also preferably of fairly resilient character so that they will spring back more or less to the arched shape when unrolled from a roll. These reflective arched sheets are placed longitudinally between rows and the longitudinal edges approach each other quite closely and the plants are, of course, in the rows between those adjacent edges. In one form, the edges of the sheets may be in contact with each other and there may be slits in one or both of the longitudinal edges of sheets so that the small part between slits may be bent down to make room for a plant stem. The sheets may, of course, be impregnated with insecticides, and the like, to help protect the plants against insect damage. The sheets may be held in place by earth piled on the longitudinal edges, or by wire staples, such as croquet wickets, which would prevent the sheets from blowing away in a high wind.

In the drawings, which show for illustrative purposes only, preferred forms of the invention:

Fig. 1 is a fragmentary top plan view of my improved means for promoting plant growth, showing the same in place between rows of plants.

Fig. 2 is a transverse sectional view through the parts shown in Fig. 1.

Fig. 3 is a fragmentary isometric view of one of the improved sheets illustrated above.

Fig. 4 is a fragmentary view on an enlarged scale similar to Fig. 2.

Fig. 5 is a transverse sectional view through a sheet with a modified configuration.

Fig. 6 is a view similar to Fig. 5, but showing a still further modification.

Fig. 7 is a fragmentary view similar to Fig. 1, but showing sheets of modified form.

Fig. 8 is a transverse sectional view in the plane of the line 8—8 of Fig. 7.

As indicated, my means for promoting plant growth consists of sheets 5 which are placed between rows of plants and the longitudinal edges 6 are laid quite close to each other, leaving room, of course, for the stems of plants which grow in the row between adjacent sheets 5—5. These sheets are of arched form, those shown in Figs. 1 to 4 being symmetrically arched, as indicated at 7 and being of generally arcuate form. These sheets are preferably composite sheets formed of a backing material to give body and stiffness to the sheets and cause them to retain the arched form noted. Such a backing may be paper, fibrous material, plastic, wood or other material, having or treated to have the necessary stiffness and yet pliability and resiliency for its present use. The material of the backing, if not weatherproof, is preferably treated with weather-proofing material, so that the backing material will not deteriorate or rot while in use. The outside of each sheet is highly reflective and, in the preferred form, consists of a sheet of very bright and therefore reflective metal foil, such as aluminum foil. These covering sheets will be weatherproof and will serve to reflect some of the sun's rays directly on to the plants, as has been indicated diagrammatically in Fig. 2. Since the entire outer surface is reflective, of course other rays will be reflected on to the plants in the adjacent row from that indicated in Fig. 2. Furthermore, rain water or sprinkled water will run off of the arched sheets on to the plants in the rows so that the root structure of the plants will be in moist soil. The soil beneath the arches will be protected and evaporation of water will, of course, be inhibited and thus water will be conserve to reflect some of the sun's rays directly on to the sheets are in contact with the ground while the intermediate portions are raised from the ground. These sheets may be held in place by means of soil on the edges or may be held in place by other means, such as wire staples, e.g. croquet wickets.

The material of which the sheets are made is preferably reasonably flexible so that long sheets may be rolled up (longitudinally) when not in use, and the material is also preferably sufficiently resilient so as to spring back into the generally arched form when the sheet is unrolled. Of course, if the sheets are not too long, they may be handled as sheets, in which case they need not be particularly resilient nor flexible since they need not be rolled up.

Fig. 4 shows the composite sheets formed of three sheets or coatings, the outside coating being of highly reflective bright sheet material, such as aluminum foil. The inner sheets may be of the materials heretofore noted and treated if necessary.

In the form shown in Fig. 5 the formed sheet is of substantially trapezoidal form, as indicated at 8.

In the form shown in Fig. 6, the sheet 9 is arched in a fashion which may be termed triangular. In any event, some of the sun's rays will be reflected by the bright outer surfaces on to the plants between rows and water will be conducted to the planted rows, as heretofore described. It will be seen that in all of the forms heretofore described, the sheets are placed in relatively close proximity to each other along their longitudinal edges, but spaced sufficiently to permit room for the stems of the plants growing in the row.

In the form shown in Figs. 7 and 8, the sheets 10 have their longitudinal edges in contact with each other, or possibly in overlapping engagement with each other, and one of the sheets along the edges, as possibly both, have rather closely spaced transverse slits 11—11 so that the tab 12 between slits may be pushed down or out of the way to make room for the stem of a plant at any such openings. Thus, in the forms shown in Figs. 7 and 8, the entire ground surface may be covered, except where the plants project through the openings noted.

In all forms of the invention, the outer surfaces are of bright reflective material, such as the surface of aluminum foil, and all are formed into arches so as to form reflective angles for reflecting the sun's rays on to the plants in the rows and so as to direct the water on to the rows themselves rather than between the rows of plants. In every case where it is desired to roll up the sheets when not in use, the material is preferably sufficiently resilient to cause the sheets to spring back to more or less their original arched shape when unrolled. If the sheets are cut into reasonable lengths so that rolling is not necessary for storage purposes, the sheets may be relatively stiff and may be handled as sheets and stored in their flat arched form without rolling. The sheets may be treated with insecticides or insect repellants so as to tend to protect the plants against insect damage while growing and the sheets act as a substitute for a mulch.

While the invention has been described in considerable detail and preferred forms illustrated, it is to be understood that various changes may be made within the scope of the invention, as defined in the appended claims.

I claim:

1. In a device for promoting plant growth, a composite multiple-ply sheet of relatively stiff material having an outer covering of highly reflective material, said sheet being readily bendable and being initially bent into the form of an arch transversely so the side edges rest on the ground and the intermediate portion is off from the ground, said sheet being designed to be substantially in side edge contact with a similar sheet, said sheet having closely adjacent slits in the edge so the material may be bent down to make room for the stem of a plant.

2. In a device for promoting plant growth, a composite elongated multi-ply sheets of relatively stiff yet bendable material to be aligned with and placed between plant rows, including an outer ply of highly light reflective material, said sheet being initially bent transversely into symmetrical general arch shape to provide a continuously curved reflective outer surface to reflect rays in multiple directions generally transversely of the sheet at both lateral sides of the arch, whereby to reflect light rays from the sun to plants along the side edge of the sheet and regardless of the sun's aspect, and to deflect and conduct water falling on the arched surface to plants at the side edges of the sheet, said sheet having only a single direction of curvature so that the outer elongated edges thereof may have direct engagement with the ground.

3. In a device for promoting plant growth, a composite elongated multi-ply sheet of relatively stiff but bendable material to be aligned with and placed between plant rows, including an outer sheet of highly reflective metal, said sheet being initially bent into a symmetrical single general arch shape with sharp downwardly directed outer elongated edges adapted to directly engage the ground and to be adjacent the elongated edge of a corresponding adjacent sheet, said multi-ply sheet at one of its said outer elongated edges having adjacent transverse slits, whereby the material between slits may be displaced so as to form spaces for plants.

References Cited in the file of this patent

UNITED STATES PATENTS

| | | |
|---|---|---|
| 1,377,566 | Eckart | May 10, 1921 |
| 1,621,440 | Stoddard | Mar. 15, 1927 |
| 1,883,381 | Kerr | Oct. 18, 1932 |
| 2,030,267 | Pratt | Feb. 11, 1936 |
| 2,740,233 | Reynolds | Apr. 3, 1956 |

FOREIGN PATENTS

| | | |
|---|---|---|
| 41,648 | Austria | Apr. 11, 1910 |
| 266,726 | Great Britain | Sept. 15, 1927 |
| 280,419 | Great Britain | Nov. 17, 1927 |
| 527,812 | Germany | June 22, 1931 |
| 629,689 | France | Aug. 2, 1927 |